United States Patent
Kucukcakar et al.

[19]
[11] Patent Number: 6,138,229
[45] Date of Patent: Oct. 24, 2000

[54] CUSTOMIZABLE INSTRUCTION SET PROCESSOR WITH NON-CONFIGURABLE/CONFIGURABLE DECODING UNITS AND NON-CONFIGURABLE/CONFIGURABLE EXECUTION UNITS

[75] Inventors: Kayhan Kucukcakar, Sunnyvale; Chih-Tung Chen, San Diego, both of Calif.

[73] Assignee: Motorola, Inc., Schaumburg, Ill.

[21] Appl. No.: 09/086,741

[22] Filed: May 29, 1998

[51] Int. Cl.[7] ........................................................ G06F 9/44
[52] U.S. Cl. ............................ 712/37; 712/208; 712/220
[58] Field of Search .............................. 712/37, 209, 212, 712/208, 220

[56] References Cited

U.S. PATENT DOCUMENTS

| | | | |
|---|---|---|---|
| 5,335,331 | 8/1994 | Murao et al. ............................ | 712/213 |
| 5,361,373 | 11/1994 | Gilson ........................................ | 712/1 |
| 5,426,378 | 6/1995 | Ong ............................................ | 326/39 |
| 5,600,845 | 2/1997 | Gilson ........................................ | 712/39 |
| 5,623,684 | 4/1997 | El-Ghoroury ............................. | 712/37 |
| 5,748,979 | 5/1998 | Trimberger ................................ | 712/37 |
| 5,819,064 | 10/1998 | Razdan et al. ............................. | 703/27 |
| 5,848,255 | 12/1998 | Kondo ....................................... | 712/212 |

*Primary Examiner*—Kenneth S. Kim
*Attorney, Agent, or Firm*—Lanny L. Parker

[57] ABSTRACT

A customizable instruction-set processor (10) implements complex, time-consuming operations by reconfiguring a portion of an instruction execution unit (34) to perform a group of specific functions in hardware rather than implementing a string of operations in software routines. The instruction execution unit (34) has a non-programmable section (46) and a programmable section (48) that receive an opcode and output control signals for controlling a datapath (16). The datapath (16) has a non-programmable datapath (18) and a programmable datapath (32). The programmable section (48) and the programmable datapath (32) are programmed by the user to provide a customizable instruction-set that controls and adds functionality to the customizable instruction-set processor (10).

9 Claims, 2 Drawing Sheets

CUSTOMIZABLE INSTRUCTION SET PROCESSOR WITH NON-CONFIGURABLE/CONFIGURABLE DECODING UNITS AND NON-CONFIGURABLE/CONFIGURABLE EXECUTION UNITS

BACKGROUND OF THE INVENTION

The present invention relates, in general, to integrated circuits and, more particularly, to data processors.

Many data processors based on conventional architectures execute software instructions in sequential fashion. Pipelining instructions within the data processor allow complex functions to be completed during a minimum of clock cycles. General purpose processors with pipeline instructions are capable of high levels of performance but require considerable blocks of integrated circuitry and firmware dedicated to the complex and high level functions. The general purpose processors are referred to as Complex Instruction Set Computers (CISC) due to the features that allow the execution of complex instructions.

Another type of data processor known as a Reduced Instruction Set Computer (RISC) incorporates a simplified instruction set. The RISC processor has less special purpose circuitry than the CISC processor and an architecture that executes each instruction within a single clock cycle. The simplified instruction set of the RISC processor accomplishes complex functions through software routines rather than through dedicated hardware. Thus, it is possible for a RISC processor with a highly efficient instruction set to execute instructions faster than a CISC processor.

Applications involving data communications are handled by processors known as Digital Signal Processors (DSPs). DSP processors have circuitry to handle such tasks as complex mathematical processing and video image generation. A variety of different data processors are available for use in providing solutions in specific applications. In general, each of the different data processors have a certain number of instructions in common. In addition to the common instructions, application specific instructions and associated hardware have been added to customize the data processor to fit the intended application.

Signed/unsigned numbers, multi-precision integer addition and subtraction, and carry/borrow control information, are a few of the integer arithmetic instructions that may be encoded into the "operation code" (opcode) depending upon the specific application. Thus, it becomes the task of the user to properly select the type of data processor having an instruction set that best fits the intended application.

General purpose data processors have an instruction set that is designed to cover a variety of applications.

Thus, the general purpose data processors may either have instructions that are not used or lack instructions that would reduce execution time and provide a data processing solution for some applications. On the other hand, DSPs are designed to fit specific applications and have instruction sets that meet the requirements of those applications.

Accordingly, it would be advantageous to have a data processor that provides an instruction set that fits the intended application. The data processor should be manufacturable and provide a cost effective solution for the data processing needs of the user.

DETAILED DESCRIPTION OF THE DRAWINGS

The customizable instruction-set processor or data processor implements complex, time-consuming operations by reconfiguring a portion of the instruction execution unit to perform a group of specific functions in hardware rather than implementing a string of operations in software routines. The instruction execution unit or controller of the data processor has an input coupled for receiving an opcode and an output for supplying control signals. A non-programmable section and a programmable section of the controller receive the opcode and supply control signals to a datapath. The programmable section is defined or programmed by the user and thereby provides a configurable instruction-set that controls the datapath.

Figure 1:
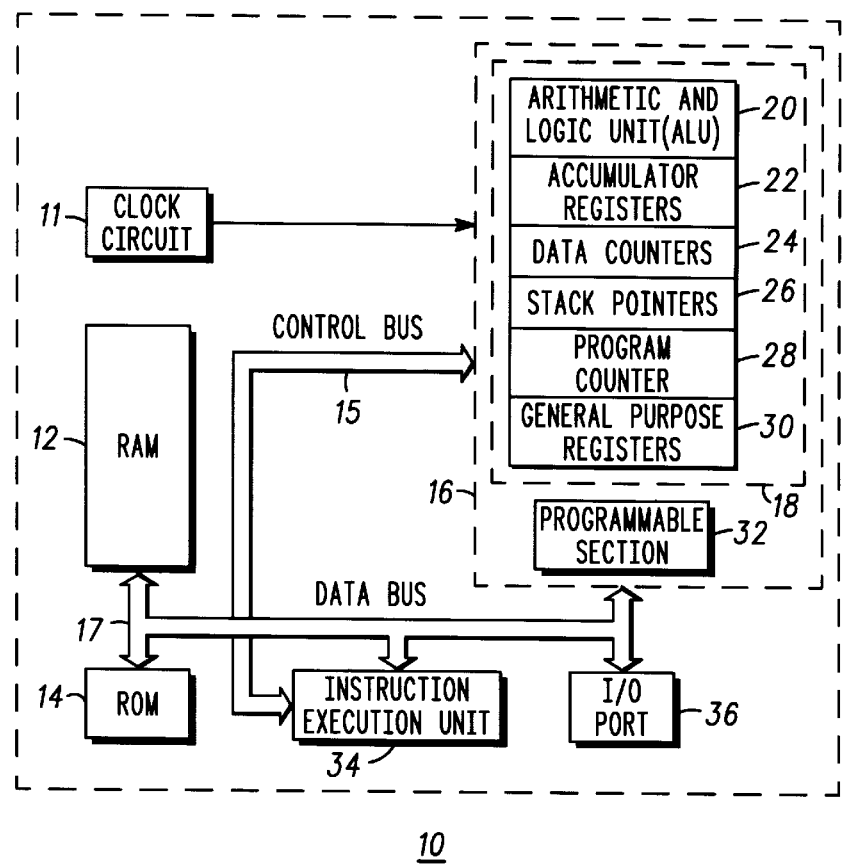
FIG. 1 is a block diagram of a customizable instruction-set processor.

FIG. 1 is a block diagram of a customizable instruction-set processor or data processor 10. A Random Access Memory (RAM) 12 and Read Only Memory (ROM) 14 are connected via a DATA BUS 17 to a datapath 16. Datapath 16 has both a non-programmable datapath 18 and a programmable datapath 32. Non-programmable datapath 18 includes a variety of registers such as an Arithmetic and Logic Unit (ALU) 20, accumulator registers 22, data counters 24, a stack pointers 26, a program counter 28, and general purpose registers 30, among others. Both non-programmable datapath 18 and programmable datapath 32 receive data from DATA BUS 17, provide functional operations on the data, and transfer data back to DATA BUS 17. Thus, data is transferred via DATA BUS 17 to registers in datapath 16 where operations such as arithmetic operations, data increments/decrements, data shifting, and logical data comparisons take place.

Instructions are loaded from the on-chip memory or from external memory during an instruction fetch cycle. Opcode valuess are received by a controller or instruction execution unit 34. The opcode is decoded and control signals generated at an output of instruction execution unit 34. The control signals are transferred via a CONTROL BUS 15 to an input of datapath 16. The control signals are gated with clock signals generated by a clock circuit 11 for synchronous transfer of data between DATA BUS 17 and registers within datapath 16. Multiple clock cycles may be required for the execution of an instruction and a signal from CONTROL BUS 15 is fed back to non-programmable section 46 and programmable section 48 to manage the subsequent fetch cycle and decode of the next opcode or the subsequent portion of the current instruction. In addition to providing connections to inputs/outputs of registers within datapath 16, DATA BUS 17 is connected to Input/Output (I/O) ports 36 and provides an electrical connection for transfer of a data signal to devices outside of data processor 10. It should be noted that the number of buses or bus connections are not a limitation of the present invention.

Figure 2:
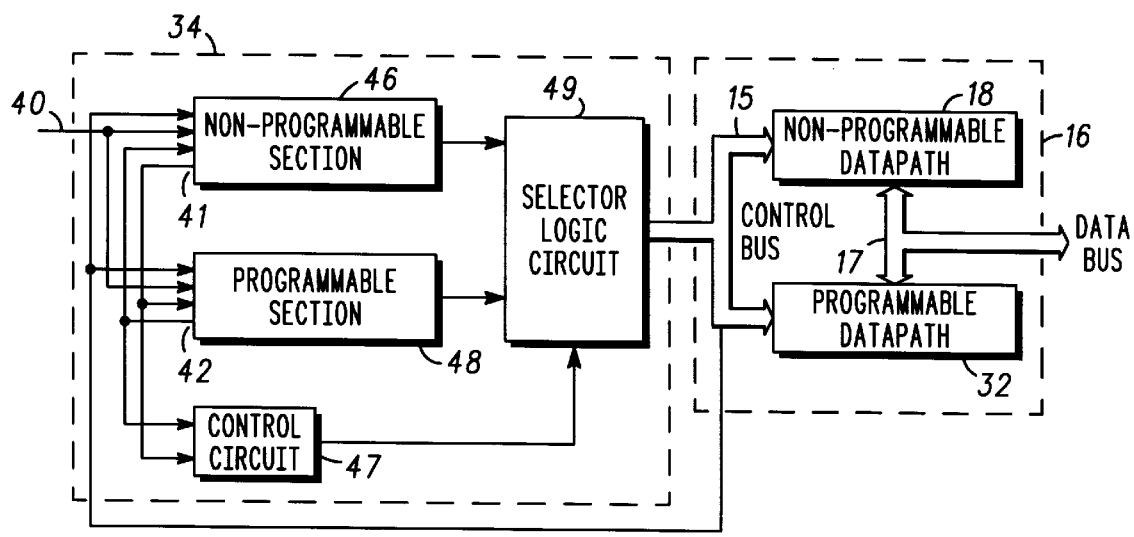
FIG. 2 is a block diagram of a portion of the customizable instruction-set processor that illustrates an instruction execution unit and a datapath.

FIG. 2 is a block diagram that illustrates one embodiment of instruction execution unit 34 and datapath 16. It should be noted that the same reference numbers are used in the figures to denote the same elements. Instruction execution unit 34 receives "operation code" (opcode) signals at input 40 and generates CONTROL BUS 15 signals at an output of instruction execution unit 34. Instruction execution unit 34 has two sections coupled for receiving the opcode signals, the first section is a non-programmable section 46 and a second section is a programmable section 48. Both non-programmable section 46 and programmable section 48 have inputs that are commonly connected to input 40 of instruction execution unit 34. An output 41 of non-programmable section 46 is commonly connected to an input of a control circuit 47 and an input of programmable section 48. An output 42 of programmable section 48 is commonly connected to another input of control circuit 47 and another input of non-programmable section 46. Although not shown, additional signal lines may connect non-programmable section 46 with programmable section 48. A select input of selector logic circuit 49 is connected to an output of control circuit 47. An output of selector logic circuit 49 is connected to CONTROL BUS 15 at an output of instruction execution unit 34. A portion of CONTROL BUS 15 is fed back and connected to yet another input of non-programmable section 46 and programmable section 48. Examples of signals generated within datapath 16 include carry-out signals, overflow signals, among others, and are included on CONTROL BUS 15 as signals which are fed back to instruction execution unit 34.

Datapath 16 includes a non-programmable datapath 18 and a programmable datapath 32, both having commonly connected inputs connected to an output of instruction execution unit 34. In addition, a DATA BUS 17 provides a signal path that connects non-programmable datapath 18 with programmable datapath 32 and to/from other blocks in data processor 10 (see FIG. 1).

Figure 3:
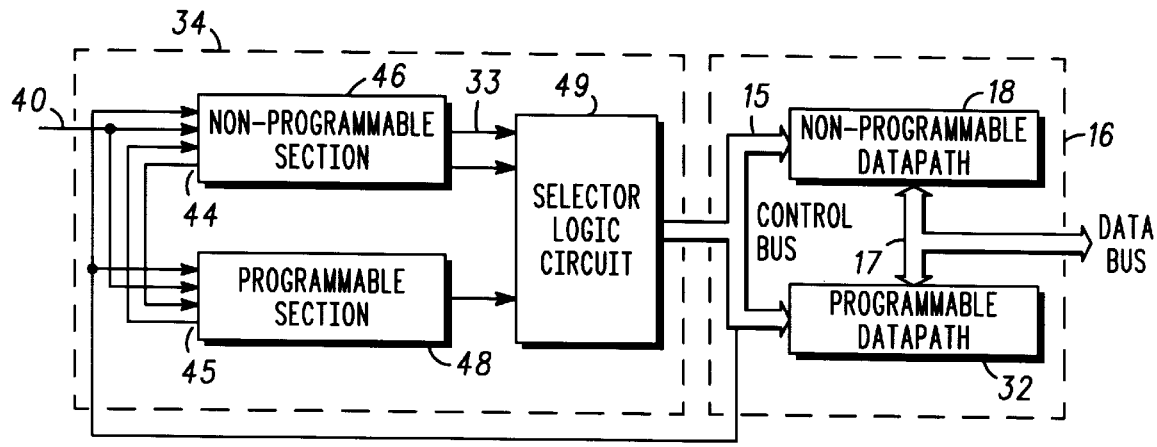
FIG. 3 is a block diagram of another embodiment of the customizable instruction-set processor of FIG. 2.

FIG. 3 is a block diagram of another embodiment of the customizable instruction-set processor of FIG. 2. In this embodiment, instruction execution unit 34 receives the opcode signals at input 40 and supplies the opcode signals to inputs of non-programmable section 46 and programmable section 48. An output 44 of non-programmable section 46 is connected to another input of programmable section 48. An output 45 of programmable section 48 is connected to another input of non-programmable section 46. An output of selector logic circuit 49 is connected to CONTROL BUS 15 at an output of instruction execution unit 34. A portion of CONTROL BUS 15 is driven by datapath 16 and fed back and connected to yet another input of non-programmable section 46 and programmable section 48.

In operation, with reference to FIG. 2, opcode signals are received at input 40 of instruction execution unit 34. Non-programmable section 46 generates control signals in accordance with decoded opcode signals. Likewise, programmable section 48 generates control signals in accordance with decoded opcode signals. The first group of opcodes that are decoded by non-programmable section 46 are different from the second group of opcodes that are decoded by programmable section 48. Selector logic circuit 49 selects either the control signals from non-programmable section 46 or programmable section 48 for transfer to datapath 16. Non-programmable section 46 provides a signal at output 41 that indicates whether the opcode decoded in non-programmable section 46 is valid. Likewise, programmable section 48 provides a signal at output 42 that indicates whether the opcode decoded in programmable section 48 is valid. Non-programmable section 46 assumes control of CONTROL BUS 15 if neither non-programmable section 46 nor programmable section 48 have valid decodes, i.e., a default instruction trap.

Alternatively, with reference to FIG. 3, opcode signals are received at input 40 of instruction execution unit 34. Non-programmable section 46 generates control signals in accordance with decoded opcode signals that are transferred through selector logic circuit 49 to CONTROL BUS 15. In addition, a portion of the opcode signals decoded by non-programmable section 46 generate a start signal that is transmitted to programmable section 48. The start signal transfers control from non-programmable section 46 to programmable section 48. Signal 33 generated by non-programmable section 46 causes selector logic circuit 49 to select control signals from programmable section 48 for transfer to CONTROL BUS 15. After the instruction has executed, a signal at output 45 of programmable section 48 causes the control for providing the opcode of the next instruction to be relinquished back to non-programmable section 46.

CONTROL BUS 15 connects instruction execution unit 34 to datapath 16 and is N-bits wide, where N is an integer number. The signals of CONTROL BUS 15 are combined with appropriate clock signals to control the synchronous transfer of data to/from registers that comprise datapath 16 (see FIG. 1). It should be noted that control signals on CONTROL BUS 15 may or may not require multiple clock cycles to completely execute an instruction.

Data processor 10 can execute a number of instructions that are basic instructions common to a wide variety of applications. The opcodes for the basic instructions are decoded by non-programmable section 46 and corresponding control signals are provided to datapath 16 via selector logic circuit 49. Thus, the basic instructions are the most widely used instructions in the users applications. Data processor 10 is manufactured with the decode logic for the basic instructions hardwired within non-programmable section 46.

In addition to the basic instructions, the user can program or reconfigure programmable section 48 to decode a group of instructions. Thus, data processor 10 is a general purpose processor having a fixed non-programmable set of basic opcodes that are decoded in non-programmable section 46 and an additional group of customizable opcodes that are defined by the user and decoded by programmable section 48 that allow data processor 10 to be application specific. The additional user-defined opcodes are decoded by programmable section 48 and transferred via selector logic circuit 49 to CONTROL BUS 15 for controlling datapath 16. Further, the function of the logic gates (not shown) within programmable datapath 32 are also programmable or reconfigurable under user control. In other words, the logic gates in programmable datapath 32 can be configured to function as latches, increment/decrement counters, hardware multipliers, an Arithmetic Logic Unit (ALU), or the like. The control signals generated by programmable section 48 control the transfer of data between DATA BUS 17 and datapath 16.

Both programmable section 48 and programmable datapath 32 are customizable to fit the user's intended application. One method of customizing data processor 10 is through a user-defined metallization layer (not shown) that interconnects a number of logic gates. In other words, programmable section 48 and programmable datapath 32 each include a group of logic gates that are configured by the metallization layer to provide user-defined decodes of opcodes. The logic gates in programmable datapath 32 are interconnected to allow execution of a user-defined function. The logic gates of programmable datapath 32 are also interconnected to provide communication with DATA BUS 17 and function, by way of example, to latch data, shift data, increment/decrement data, etc.

Another embodiment for customizing data processor 10 includes configuring programmable section 48 and programmable datapath 32 by a Field Programmable Gate Array (FPGA) integrated with data processor 10. The user-configurable FPGA in programmable section 48 is configured by the user to decode opcodes and provide control signals to datapath 16. The user-configurable FPGA in programmable datapath 32 is configured by the user to transfer data to/from DATA BUS 17 and function, by way of example, to latch data, shift data, increment/decrement data, etc. The method of configuring the FPGA is not intended as a limitation of the present invention. Alternatively, devices such as ferroelectric transistors can be programmed and configured to provide decoding of user-defined opcodes in programmable section 48 and the user-specified logic functions in programmable datapath 32.

As an example of an instruction that causes data to be shifted, the opcode for the instruction is provided from memory to input 40 of instruction execution unit 34 (FIG. 2). In this example the decode for the shift instruction occurs in non-programmable section 46. Non-programmable section 46 provides the decode of the received opcode and provides control signals to selector logic circuit 49. In addition, non-programmable section 46 generates a signal for control circuit 47 that indicates the received opcode has been properly decoded. The select signal generated by control circuit 47 allows the control signals generated by non-programmable section 46 to be transferred to CONTROL BUS 15. The control signals are gated by a clock signal from clock circuit 11 (FIG. 1) to provide synchronous control of data in non-programmable datapath 18. The control signals cause data to shift in a register, such as a register within general purpose registers 30. When the instruction for data shifting has executed, the next instruction can be executed. Other instructions such as branch instructions, compare instructions, jump instructions, move instructions, and negate instructions, among others, can be decoded by non-programmable section 46 and control signals transferred to non-programmable datapath 18 via selector logic circuit 49.

As an example of an instruction that causes a hardware multiply, the user configures programmable section 48 and programmable datapath 32 to accept the multiply instruction. In other words, for this example the multiply instruction is not part of the instruction set of data processor 10 when manufactured, i.e., the multiply instruction in an invalid instruction. However, the multiply instruction can be added by the user by configuring or programming the FPGA that is included in programmable section 48. Thus, programmable section 48 is programmed to accept the opcode received at input 40 of instruction execution unit 34 and generate valid control signals for use by datapath 16. Programmable section 48 signals control circuit 47 that the multiply opcode has been properly decoded. A select signal from control circuit 47 is generated in response to programmable section 48 providing a valid decode of the received opcode for a multiply. The select signal causes the control signals generated by programmable section 48 to be transferred through selector logic circuit 49 to CONTROL BUS 15.

In addition, a portion of the FPGA within programmable datapath 32 is configured by the user to operate as a multiplier. The multiplier was not part of the hardware included in data processor 10 when manufactured, i.e., data processor 10 could only multiply by repeating "shift" and "add" instructions. The configured FPGA multiplier receives the control signals and multiplies a data value stored in a register of non-programmable datapath 18 and a data value received on DATA BUS 17. When the multiply instruction has executed instruction execution unit 34 accepts the next opcode. It should be noted that the types of instructions included in data processor 10 when manufactured, i.e., the opcodes decoded by non-programmable section 46 are not limitations of the present invention. It should be further noted that the types of instructions defined by the user, i.e., the opcodes decoded by programmable section 48, are not a limitation of the present invention.

The user-definable instructions (opcodes) provide trade-off capabilities to a user. For example, a hexadecimal-to-binary conversion takes about 30 to 53 clock cycles to execute on a Motorola 68HC11 processor and requires about 39 bytes of code in the program memory, i.e., either RAM 12 or ROM 14 (see FIG. 1). In accordance with the present invention, the hexadecimal-to-binary conversion takes about 7 to 13 clock cycles to execute, resulting in better than 75 percent reduction in run time. In addition, the program memory used by the present invention takes one byte of code in the program memory. It should be noted that the embodiments illustrated in FIGS. 2 and 3 provide different trade-offs to the user. The embodiment illustrated in FIG. 2 is flexible and does not restrict the number of opcodes a user chooses to add to the processor during the customizing step. The number of new opcodes is limited by the size of programmable section 48 and the number of instructions available in the instruction set. On the other hand, the embodiment illustrated in FIG. 3 fixes the number of user-definable opcodes, but not the function defined by the opcodes, in advance of the user customizing step. This results in an efficient implementation which reduces the cost of the data processor.

Figure 4:
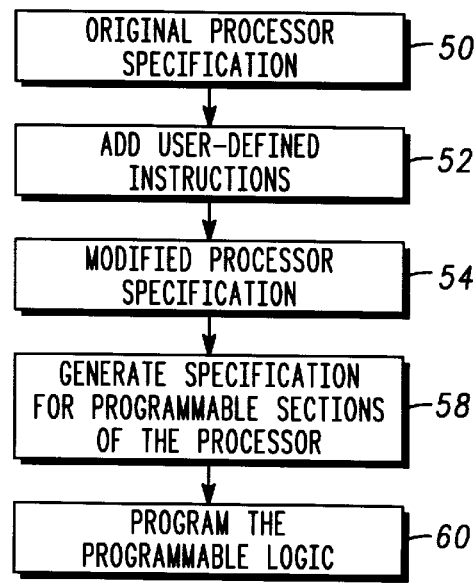
FIG. 4 has table entries that illustrate a method of configuring user-defined instructions in the instruction execution unit and corresponding logic in the datapath.

FIG. 4 has table entries that illustrate a method of configuring user-defined instructions in the controller and associated logic in the datapath. Table entry 50 is ORIGINAL PROCESSOR SPECIFICATION which refers to a step of providing a specification that describes the complete functional definition of data processor 10, but without any definition of the programmable logic that is found in programmable section 48 and programmable datapath 32.

Table entry 52 is ADD USER-DEFINED INSTRUCTIONS which refers to a step of providing functional details to the specification of the additional instructions that the user desires to implement in hardware.

Table entry 54 is MODIFIED PROCESSOR SPECIFICATION which refers to combining the functional description of the ORIGINAL PROCESSOR SPECIFICATION of table entry 50 and the ADD USER-DEFINED INSTRUCTIONS of table entry 52. The combined functional descriptions allow the user to write a complete hardware description that models the functionality described in the combined specification.

Table entry 58 is GENERATE SPECIFICATION FOR PROGRAMMABLE SECTIONS OF THE DATA PROCESSOR which refers to a step of specifying the user-defined instruction decoding function in programmable section 48 and the user-defined datapath function in programmable datapath 32. It is not a limitation of the present invention that the ORIGINAL PROCESSOR SPECIFICATION and the MODIFIED PROCESSOR SPECIFICATION are in the form of what is commonly known as an instruction set definition and algorithmic in behavior. The difference between the ORIGINAL PROCESSOR SPECIFICATION and the MODIFIED PROCESSOR SPECIFICATION clearly define the logic which should reside in programmable section 48 and programmable datapath 32.

The HDL of table entry 58 can be converted to the design data of a gate level circuit by inputting the description written in RTL to a logic synthesis tool. The additional logic needed for user-defined additional instructions is converted to logic for the decoder implemented in programmable section 48 (FIG. 2) and logic for the functional block implemented in programmable datapath 32. For the example, the user may decide that rather than multiplying two digital values using a software routine that repeats "add" and "shift" instructions, application code and execution time could be reduced by including a user-defined multiplier instruction. It should be noted that the HDL description of the added instructions is separate from the HDL description of the ORIGINAL PROCESSOR SPECIFICATION as described in table entry 50. By keeping the HDL descriptions of table entries 50 and 58 separate there is a correlation of inputs, outputs, and logic gates available in the FPGAs of programmable section 48 and programmable datapath 32 (FIG. 2) and the inputs, outputs, and logic gates available in non-programmable section 46 and non-programmable datapath 18.

Table entry 60 is PROGRAM THE PROGRAMMABLE LOGIC which refers to a step of either generating a metal mask to define the connections of gates, or alternatively, programs the FPGA in programmable section 48 and programmable datapath 32. Thus, data processor 10 is customized by user-defined instructions to provide the user with trade-offs that allow functions to be implemented in software routines or configurable logic for implementing the desired functionality.

By now, it should be appreciated that a data processor having a programmable controller can be configured to execute both programmable and non-programmable opcodes to increase the performance of the data processor and increase code density. The programmable instruction-set processor provides an economical customization capability for the diversity of applications by providing the user with either hardware or software choices to implementing complex, time-consuming operations. The user can specify functions used in the application that should be implemented in hardware rather than implementing a string of operations through software routines. By configuring a portion of the instruction execution unit and datapath, the customizable instruction-set processor offers superior code packing capabilities. The architecture of the customizable instruction-set processor improves the performance and code size of an application through field configurable logic.

What is claimed is:

1. A processor having a configurable instruction-set, comprising:
    a memory having a terminal for supplying an opcode;
    an instruction execution unit having an output for supplying control signals generated from a user-specified opcode and a predetermined opcode, wherein the instruction execution unit further includes;
        a nonconfigurable section having an input coupled for receiving the predetermined opcode and an output for supplying a first portion of the control signals, and
        a configurable section having an input coupled for receiving the user-specified opcode and an output for supplying the second portion of control signals; and
    a datapath for processing data signals that includes a nonconfigurable section having a control input for receiving the first portion of the control signals and a configurable section having a control input for receiving the second portion of the control signals.

2. The processor of claim 1, wherein a second input of the nonconfigurable datapath is coupled to a second input of the configurable datapath via a data bus.

3. The processor of claim 1, further including a selector logic circuit having a first input coupled to the output of the nonconfigurable section for receiving the first portion of control signals, a second input coupled to the output of the configurable section for receiving the second portion of control signals, a third input coupled for receiving a select signal, and an output coupled to the output of the instruction execution unit for supplying the control signals.

4. The processor of claim 1, wherein the configurable section includes a Field Programmable Gate Array.

5. A customizable instruction-set processor, comprising:
    a nonconfigurable datapath having an input;
    a configurable datapath having an input;
    a first section of an instruction execution unit that is nonconfigurable to decode a first portion of opcodes and provide first control signals; and
    a second section of the instruction execution unit that is configurable to decode a remaining portion of opcodes and provide second control signals, wherein the first control signals are received at the input of the nonconfigurable datapath and the second control signals are received at the input of the configurable datapath.

6. The customizable instruction-set processor of claim 5, wherein the configurable datapath and the nonconfigurable datapath are commonly connected via a data bus.

7. A processor having a configurable instruction-set, comprising:
    a data bus for transferring a data signal;
    a memory for storing an opcode;
    an instruction execution unit having a nonconfigurable section and a configurable section and an input coupled to an output of the memory for receiving the opcode and an output for providing control signals;
    a first datapath having an input coupled to the data bus for processing the data signal on the data bus in response to the control signals from the nonconfigurable section of the instruction execution unit, wherein the first datapath is nonconfigurable; and
    a second datapath having an input coupled to the data bus for processing the data signal on the data bus in response to the control signals from the configurable section of the instruction execution unit, wherein the second datapath is configurable.

8. The processor of claim 7, wherein the instruction execution unit further includes:
    a first section coupled for receiving the opcode and providing a first portion of the control signals, wherein the first section is nonconfigurable; and
    a second section coupled for receiving the opcode and providing a second portion of the control signals, wherein the second section is configurable.

9. The processor of claim 8, wherein the instruction execution unit further includes a selector logic circuit having a first input coupled for receiving the first portion of the control signals, a second input coupled for receiving the second portion of the control signals, and a select signal that transfers one of the first portion of the control signals and the second portion of the control signals to the first and second datapaths.

* * * * *